(12) United States Patent
Kim et al.

(10) Patent No.: US 10,313,852 B2
(45) Date of Patent: Jun. 4, 2019

(54) METHOD AND DEVICE FOR SELECTING DISTRIBUTED ANTENNA IN VEHICLE-TO-VEHICLE COMMUNICATION SYSTEM

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/750,356

(22) PCT Filed: Apr. 8, 2016

(86) PCT No.: PCT/KR2016/003699
§ 371 (c)(1),
(2) Date: Feb. 5, 2018

(87) PCT Pub. No.: WO2017/022928
PCT Pub. Date: Feb. 9, 2017

(65) Prior Publication Data
US 2018/0227728 A1 Aug. 9, 2018

Related U.S. Application Data

(60) Provisional application No. 62/202,138, filed on Aug. 6, 2015.

(51) Int. Cl.
*H04W 4/00* (2018.01)
*H04W 4/46* (2018.01)
(Continued)

(52) U.S. Cl.
CPC ............ *H04W 4/46* (2018.02); *H04B 7/022* (2013.01); *H04B 7/06* (2013.01); *H04B 7/0602* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2012/0077430 A1* 3/2012 Stuebing ................ G08G 1/161
455/39
2012/0327840 A1* 12/2012 Chen ...................... G08G 1/163
370/315

(Continued)

FOREIGN PATENT DOCUMENTS

KR 1020130097117 A 9/2013
KR 1020140051175 A 4/2014
(Continued)

*Primary Examiner* — Siren Wei
(74) *Attorney, Agent, or Firm* — Dentons US LLP

(57) ABSTRACT

The present invention relates to a method for a terminal selecting a distributed antenna in a vehicle-to-vehicle communication system. Here, the method may comprise the steps of: receiving, from all the terminals in a group in which the terminal is included, channel space information for each of the terminals; determining a DU selection on the basis of the received channel space information for each of the terminals; and transmitting the determined DU selection information. Here, the terminal may determine all of the DU selection for each of every terminal in the group, and transmit each determined DU selection information to the corresponding terminal.

15 Claims, 14 Drawing Sheets

(51) Int. Cl.
*H04B 7/06* (2006.01)
*H04B 7/08* (2006.01)
*H04W 72/02* (2009.01)
*H04B 7/022* (2017.01)
*H04W 88/02* (2009.01)

(52) U.S. Cl.
CPC ............ *H04B 7/063* (2013.01); *H04B 7/0639* (2013.01); *H04B 7/08* (2013.01); *H04W 72/02* (2013.01); *H04W 88/02* (2013.01)

(56) References Cited

U.S. PATENT DOCUMENTS

2014/0133435 A1    5/2014  Forenza et al.
2015/0296413 A1* 10/2015  Sadek ................. H04B 1/1027
                                                          375/348

FOREIGN PATENT DOCUMENTS

WO      2011002214 A2    1/2011
WO      2011132968 A2  10/2011

* cited by examiner (a) Control-plane protocol stack (b) User-plane protocol stack (a)　　　　　　　　(b)

METHOD AND DEVICE FOR SELECTING DISTRIBUTED ANTENNA IN VEHICLE-TO-VEHICLE COMMUNICATION SYSTEM

This application is a National Stage Application of International Application No. PCT/KR2016/003699, filed on Apr. 8, 2016, which claims the benefit of U.S. Provisional Application No. 62/202,138, filed on Aug. 6, 2015, all of which are hereby incorporated by reference in their entirety for all purposes as if fully set forth herein.

TECHNICAL FIELD

The present invention relates to a wireless communication system, and more particularly to a wireless communication system applied to vehicle-to-vehicle (V2V) communication.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

In addition, recently, interest in a vehicular communication system has increased. More specifically, interest in a method of applying wireless communication technology and position tracking technology (global positioning system (GPS)) to a vehicle and providing a service such as vehicle diagnosis, theft detection, route guidance or traffic service provision to a driver who uses the vehicle in real time has increased. At this time, there is a need for methods of efficiently performing vehicular communication in consideration of the appearance and mobility of a vehicle and interference with another vehicle in a vehicular communication system.

DISCLOSURE

Technical Problem

The present invention is devised to solve the above problems, and one technical task of the present invention is to provide a method and apparatus for selecting a distributed unit (DU) in a V2V communication system.

Another technical task of the present invention is to provide a method and apparatus for efficiently selecting a distributed unit (DU) for V2V communication in consideration of a densely distributed vehicle environment.

Technical Solutions

The object of the present invention can be achieved by providing a method for selecting a distributed unit (DU) by a user equipment (UE) in a vehicle-to-vehicle (V2V) communication system including: receiving channel spatial information about respective UEs from all UEs contained in a group in which the UE is included; deciding DU selection on the basis of the received channel spatial information about the respective UEs; and transmitting the decided DU selection information, wherein the UE decides DU selection for each of all the UEs contained in the group, and transmits the decided DU selection information of each UE to the corresponding UE.

In accordance with another aspect of the present invention, a user equipment (UE) apparatus for selecting a distributed unit (DU) in a vehicle-to-vehicle (V2V) communication system includes: a transceiver module configured to transmit and receive information to and from an external device; and a processor configured to control the transceiver module, wherein the processor controls the transceiver module to receive channel spatial information about respective UEs from all UEs contained in a group in which the UE is included, decides DU selection on the basis of the received channel spatial information about the respective UEs, and transmits the decided DU selection information using the transceiver module. The UE decides DU selection for each of all the UEs contained in the group, and transmits the decided DU selection information of each UE to the corresponding UE.

In accordance with embodiments of the present invention, the following items can be commonly applied to a method and apparatus for selecting a distributed unit (DU) in a V2V communication system.

The channel spatial information about the respective UEs may be based on a DU selection combination capable of being adjusted by the respective UEs.

The channel spatial information about the respective UEs is information about some preferred DU selections from among the adjustable DU selection combinations.

The user equipment (UE) configured to receive the channel spatial information about the respective UEs from all the UEs may be a header UE of the group.

The header UE may be designated by a base station (BS).

The channel spatial information may include at least one of an AoD (Angle of Departure), a PMI (Precoding Matrix Index), an AoD indicator, an angular spread of clusters, a preferred transmit (Tx) beam index, and a transmit (Tx) correlation matrix.

When the channel spatial information includes the PMI and a final precoder used by the respective UEs is composed of at least two PMIs, the PMI contained in the channel spatial information may be identical to some PMIs constructing the final precoder.

The some PMIs may correspond to a PMI associated with a broad beam.

The UE may decide DU selection for each UE in a manner that channel spatial correlation between all the UEs contained in the group is gradually reduced on the basis of the transmit (Tx) correlation matrix.

When the preferred transmit (Tx) beam index is contained in the channel spatial information, the UE may decide DU selection for each UE in a manner that the beam index is gradually elongated in association with all the UEs contained in the group.

When all the UEs contained in the group exchange channel spatial information about the respective UEs with one another using broadcasting/multicasting, the respective UEs contained in the group may decide only their own DU selection.

The user equipment (UE) may receive channel spatial information about the respective UEs contained in the group, only when an event for the group has occurred.

The DU selection may be decided on the basis of the number and position of DUs activated in the UE.

Advantageous Effects

As is apparent from the above description, the embodiments of the present invention can provide a method and apparatus for selecting a distributed unit (DU) in a V2V communication system.

The embodiments of the present invention can provide a method and apparatus for efficiently selecting a distributed unit (DU) for V2V communication in consideration of a densely distributed vehicle environment.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Figure 1:
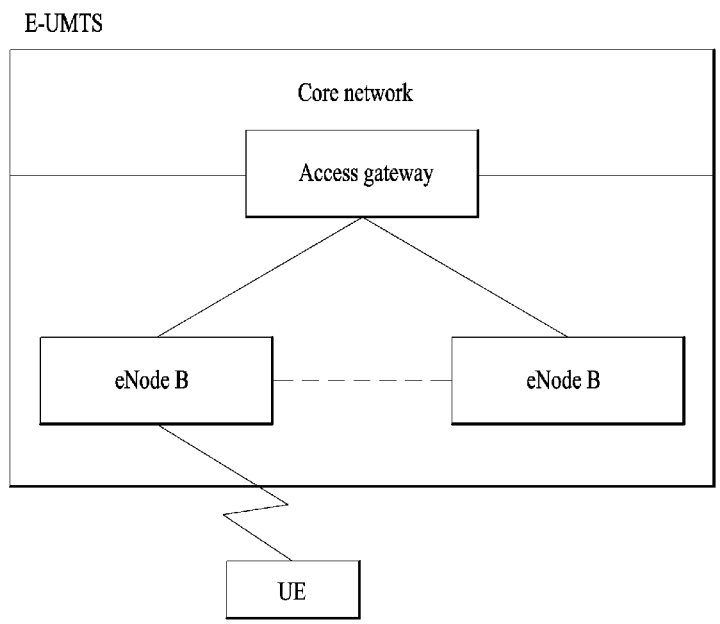
FIG. 1 is a diagram schematically illustrating a network structure of an E-UMTS as an exemplary radio communication system according to an embodiment of the present invention.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a 3rd Generation Partnership Project (3GPP) system, 3GPP Long Term Evolution (LTE) and LTE-Advanced (LTE-A) systems, and a 3GPP2 system. That is, the steps or portions, which are not described in order to make the technical spirit of the present invention clear, may be supported by the above documents. In addition, all the terms disclosed in the present document may be described by the above standard documents.

The following technology can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

Figure 2:
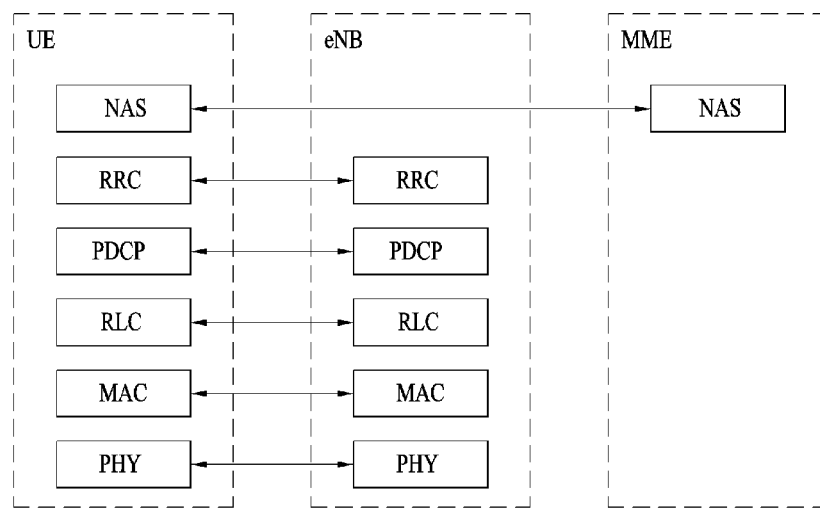
FIG. 2 is a diagram illustrating structures of a control plane and a user plane of a radio interface protocol between a UE and an E-UTRAN based on the 3GPP radio access network specification according to an embodiment of the present invention.
Figure 2:
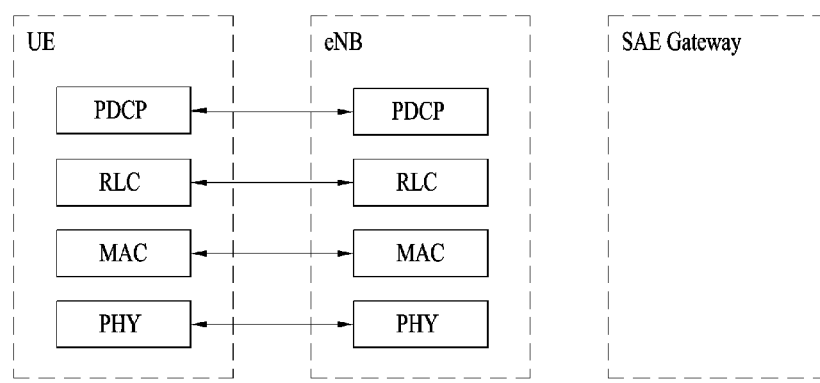

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
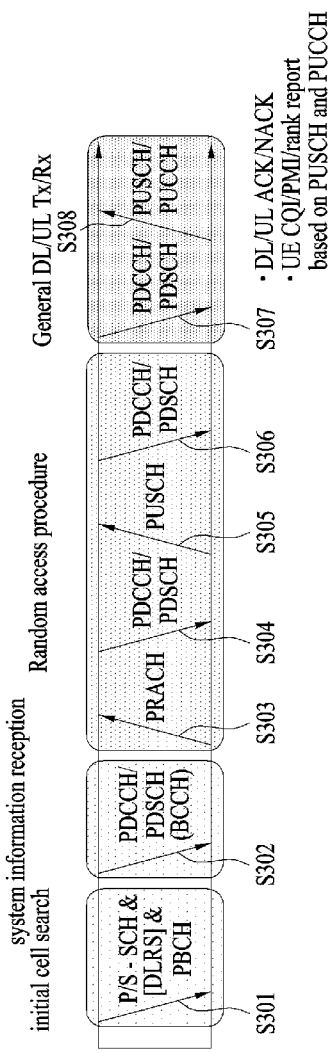
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
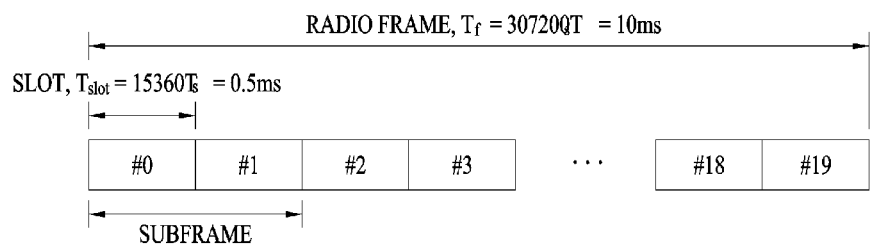
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
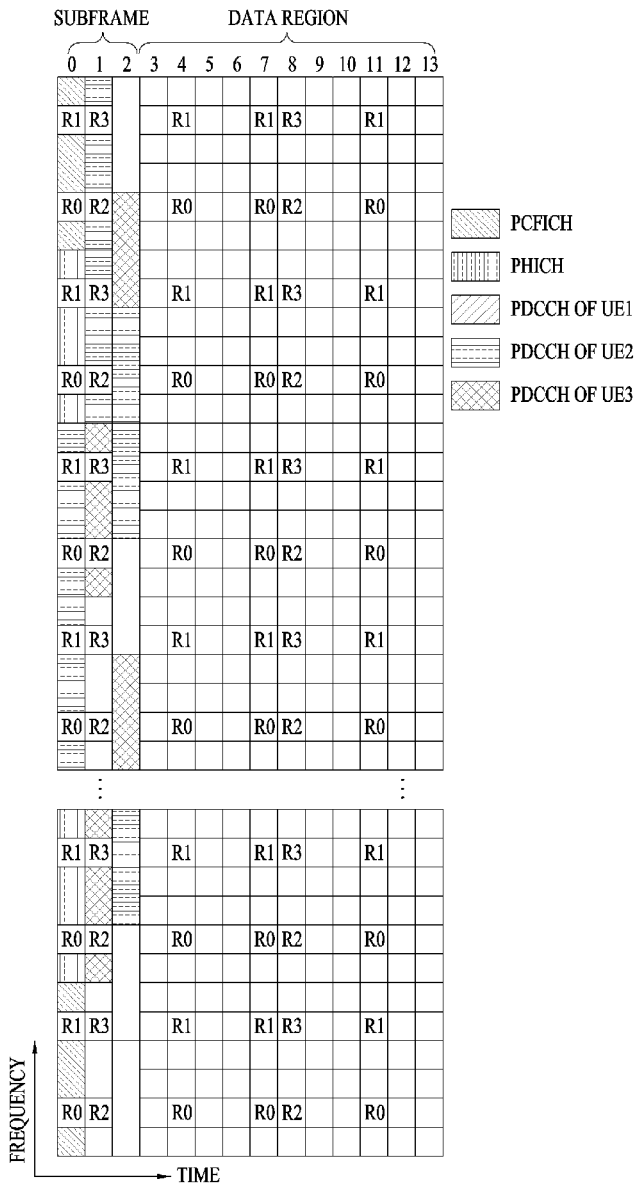
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
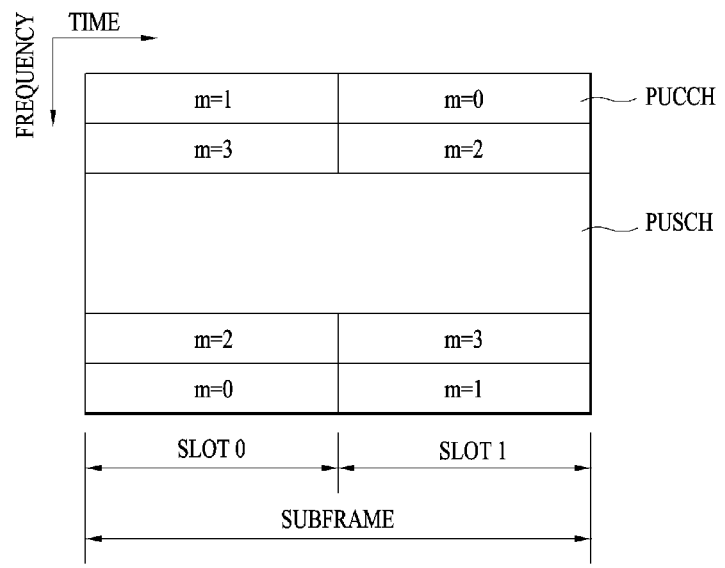
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
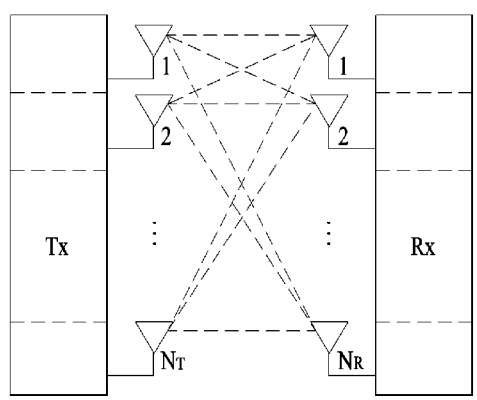
FIG. 7 is a diagram showing the structure of a general multiple input multiple output (MIMO) communication system according to an embodiment of the present invention.

FIG. 7 is a diagram showing the structure of a general multiple input multiple output (MIMO) communication system according to an embodiment of the present invention.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 7 illustrates the configuration of a typical MIMO communication system. A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that NT Tx antennas and NR Rx antennas are present as illustrated in FIG. 7. Regarding a transmission signal, up to NT pieces of information can be transmitted through the NT Tx antennas, as expressed as the vector of Equation 2 below.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as shown in Equation 4 below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix functions to appropriately distribute the transmission information to individual antennas according to transmission channel states, etc. The transmission signals $x_1, x_2, \ldots, x_{N_T}$ are represented as a vector X, as shown in Equation 5 below. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as shown in Equation 6 below.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is expressed as shown in Equation 7 below.

$$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 1, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{ (if rank} = r),$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$ representing the correlation characteristics of the horizontal and vertical antenna groups, respectively. $X_i(k)$ is expressed as a vector having the linear phase increment property, reflecting the correlation characteristics between antennas in each antenna group. As a representative example, a discrete Fourier transform (DFT) matrix may be used.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinafter, a vehicular communication system based on the above-described wireless communication system will be described.

Figure 8:
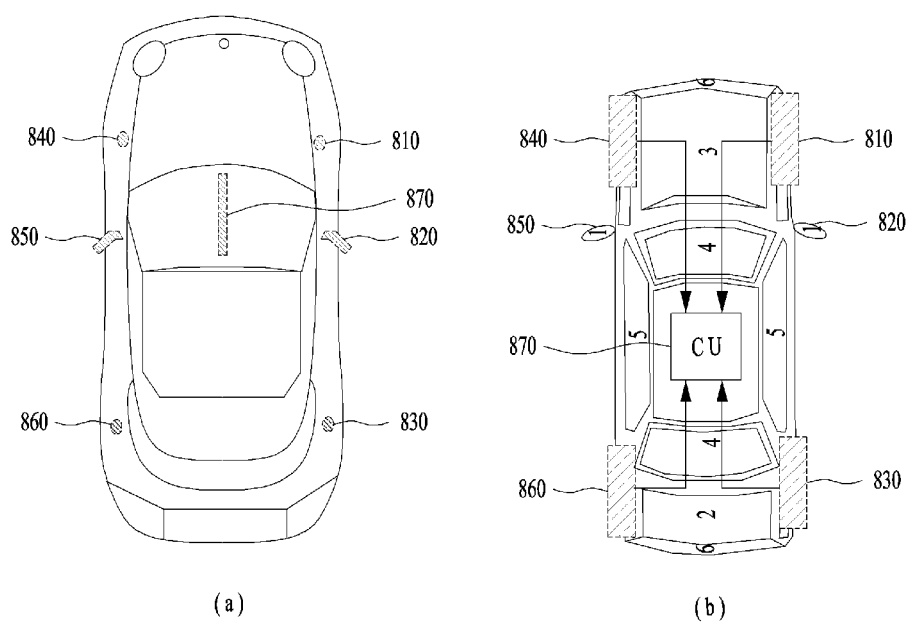
FIG. 8 is a diagram showing a vehicle including a plurality of antenna arrays according to an embodiment of the present invention.

FIG. 8 is a diagram showing a vehicle including a plurality of antenna arrays according to an embodiment of the present invention. The number of uses of the above-described wireless communication system and service categories using the wireless communication system have increased. At this time, unlike an existing static service, need to provide high data throughput, high data rate and high quality of service (QoS) to user equipments (UEs) or users moving at a high speed has increased.

For example, a wireless communication system needs to support wireless services having good quality to moving UEs when a plurality of UEs or users (hereinafter, collectively referred to as a UE) desires to view multimedia content while using public transportation or when a plurality of UEs of passengers riding in a personal vehicle traveling on an expressway uses different wireless communication services.

However, a conventional wireless communication system has some limits in provision of a service to a UE in consideration of high-speed movement or mobility. At this time, in order to support a service, a system network needs to be revolutionized. In addition, a new system for maintaining compatibility with an existing network infrastructure without influencing the existing network infrastructure needs to be designed.

At this time, for example, as described below, a large-sized antenna array may be mounted in a vehicle such that the vehicle acquires large array gain, thereby providing services having good quality to UEs located in the vehicle even in a state in which the vehicle moves at a high speed. At this time, in the vehicle, data received through a central unit (hereinafter, CU) may be relayed to the UEs located in the vehicle. At this time, a vehicular MIMO system may be considered. At this time, as described above, if a large-sized antenna array is used, the vehicle can prevent communication performance from being lowered due to penetration loss having an average value of 20 dB. In addition, since the vehicle uses receive (rx) antennas greater in number than the number of UEs using a system, large array gain can be easily obtained and reception diversity can be obtained by ensuring a distance between the receive antennas. That is, it is possible to provide a service to a UE moving at a high speed without additionally designing a network through the vehicular MIMO system.

In spite of the above-described advantages, up to now, it has been difficult to apply a vehicular MIMO system due to problems related to vehicle appearance and manufacturing system establishment. In addition, the vehicle is significantly expensive as compared to a personal portable communication device and cannot be easily improved and updated. In addition, since the vehicle should satisfy many requirements such as design concept and aeromechanical structure in addition to communication performance, the design of the vehicle may be aesthetically/aeromechanically restricted. For example, some vehicle manufacturers have used complex antennas having quality inferior to that of a single antenna in order to eliminate visual inconvenience of an existing antenna.

In order to solve spatial restriction of a large-sized antenna array in an environment in which a communication system needs to be developed, installation of a distributed antenna array system for implementing a multi-antenna-array system in a vehicle has been gradually introduced in consideration of vehicle appearance.

At this time, for example, referring to FIG. 8, a vehicle may include a plurality of antennas 810, 820, 830, 840, 850 and 860 mounted therein. At this time, the locations and number of the plurality of antennas 810, 820, 830, 840, 850 and 860 may be changed according to vehicle design. At this time, the below-described configuration is equally applicable even when the locations and number of the plurality of antennas 810, 820, 830, 840, 850 and 860 mounted in the vehicle are changed, and the present invention is not limited to the below-described embodiments. That is, the present invention is applicable to antennas having various shapes and radiation patterns according to the locations of the plurality of antennas 810, 820, 830, 840, 850 and 860.

At this time, signals for distributed antenna units (DUs) of the vehicle may be controlled through a central unit (CU) 870. That is, the CU 870 of the vehicle may control the signals for the DUs 810, 820, 830, 840, 850 and 860 mounted in the vehicle to receive a signal from a base station while maximizing reception diversity and to prevent wireless connection between the base station and the vehicle in a state in which the vehicle moves at a high speed. That is, the vehicle may be a UE having a plurality of antennas or a relay for relaying a signal. The vehicle may provide a service having good quality to a plurality of UEs located in the vehicle through control and relay of the signal received through the CU 870.

Figure 9:
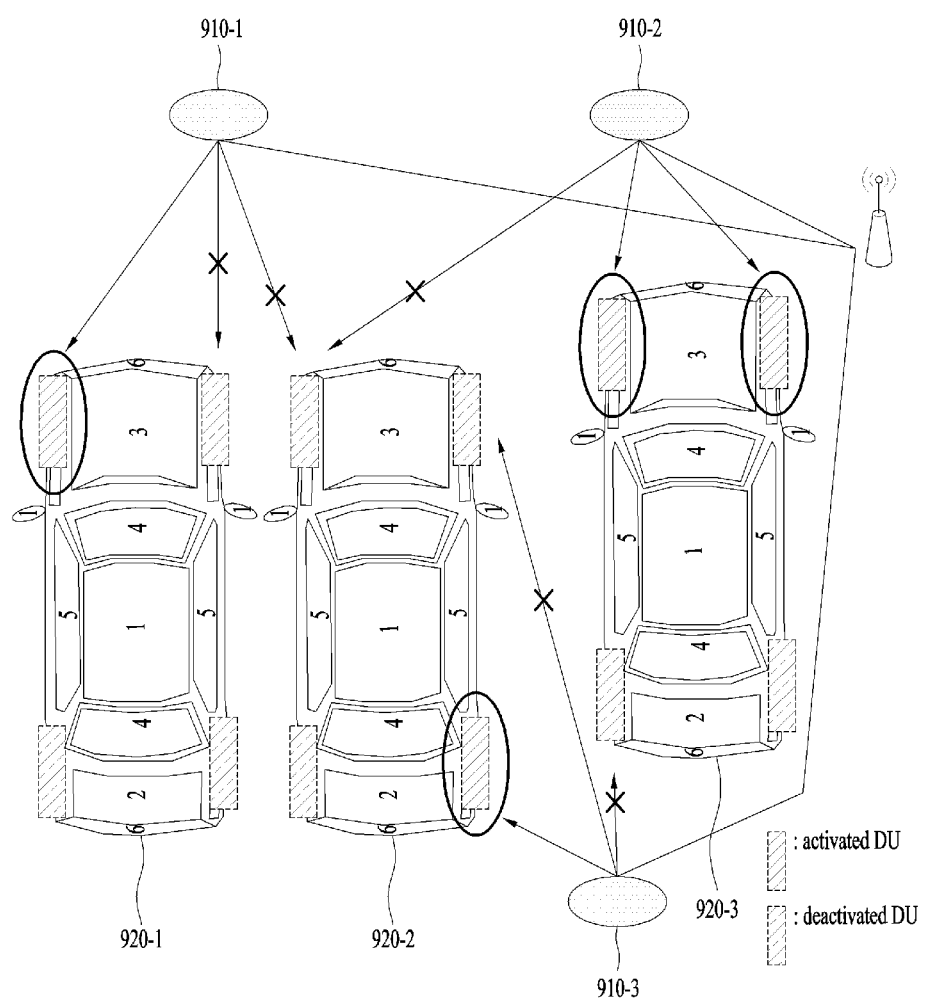
FIG. 9 is a diagram showing a method of selecting a distributed antenna unit (DU) in a state in which a plurality of vehicles is concentrated, according to an embodiment of the present invention.

FIG. 9 is a diagram showing a method of selecting a distributed antenna unit (DU) in a state in which a plurality of vehicles is concentrated, according to an embodiment of the present invention.

As described above, a vehicle may include a plurality of DUs and a CU 870 for controlling the DUs. At this time, a plurality of vehicles 920-1, 920-2 and 920-3 may be concentrated in a narrow area. For example, the plurality of vehicles 920-1, 920-2 and 920-3 may be concentrated in a narrow area upon city driving or upon a traffic jam. At this time, if the plurality of vehicles 920-1, 920-2 and 920-3 is concentrated, it may be difficult to distinguish between beams for the DUs of the vehicles due to beam sharpness. For example, if a plurality of vehicles is close to each other, the DU located at the right side of the first vehicle 920-1 may be adjacent to the DU located at the left side of the second vehicle 920-2 and thus the beams for these DUs may not be easily distinguished. That is, since DUs located adjacent to each other receive signals undergoing similar channel environments, a plurality of DUs may be likely to receive the same beam or not to receive a signal due to blocking of obstacles.

Accordingly, activation of the DUs deployed in the plurality of vehicles 920-1, 920-2 and 920-3 needs to be controlled. More specifically, the vehicles 920-1, 920-2 and 920-3 may selectively control activation or deactivation of the DUs based on the density of neighboring vehicles. For example, when a beam transmitted from a first base station 910-1 to a first vehicle 920-1 is received, the first vehicle 920-1 may activate only the DUs located at the left side of the first vehicle 920-1 and deactivate the remaining DUs of the first vehicle 920-1, to be distinguished from the adjacent second vehicle 920-2. At this time, for example, the first vehicle 920-1 may determine whether vehicles are concentrated using a position information reception unit (e.g., a GPS) or a proximity sensor. In addition, for example, whether the DUs are deactivated may be determined based on a threshold value based on density of vehicles. At this time, a threshold value may be a criterion value for determining activation or deactivation. That is, a criterion for determining whether the vehicles 920-1, 920-2 and 920-3 are concentrated may be changed and is not limited to the above-described embodiment.

In addition, the third vehicle 920-3 may activate two DUs located at the front side of the third vehicle 920-3 in order to receive the beam from the second base station 910-2. That is, the vehicles 920-1, 920-2 and 920-3 may selectively activate/deactivate the DUs thereof to distinguish the beam received through the activated DUs thereof from the beams capable of being received by adjacent vehicles. Therefore, beams passing through independent paths experiencing different clusters are received, thereby improving beam reception performance.

In addition, the vehicles may feed information on activation and deactivation of the DUs back to the base station as described above. At this time, for example, the above-described information may be fed back along with channel state information (CSI) fed back from the vehicles to the base station.

More specifically, a transmission end needs to obtain information on a channel and to accurately measure a suitable beam and gain obtained upon using the beam based on the information. At this time, in a wireless communication system, a reception end (e.g., a UE or a vehicle) may feed channel information back to the transmission end (e.g., the base station) in the form of CSI after measuring the channel.

At this time, for example, in a MIMO system, since a plurality of antennas is used, a plurality of channels may be present and CSI may be defined as a combination of sub-channels. At this time, as the number of antennas used in the MIMO system increases, a complicated format may be used. In consideration of such an environment, an implicit CSI reporting scheme or an explicit CSI reporting scheme may be used as a CSI reporting scheme. That is, an implicit CSI reporting scheme or an explicit CSI reporting scheme may be used as a CSI reporting scheme of a massive MIMO environment.

At this time, for example, the implicit CSI reporting scheme may refer to a scheme of analyzing information on a channel measured by a reception end and reporting only information substantially necessary to generate a beam, without reporting the information on the channel measured by the reception end. That is, only necessary information may be fed back based on a predefined or predetermined value.

In contrast, the explicit CSI reporting scheme may refer to a scheme of reporting information maximally approximating to a measured value to a transmission end without a process of analyzing a channel measured by a reception end. At this time, a method of quantizing a MIMO channel represented in a matrix or performing SVD operation may be used in the channel information. For example, the implicit CSI report information may include a precoding matrix index (PMI), a channel quality indicator (CQI), rank information (RI), etc. In addition, the explicit CSI report information may include channel coefficient quantization & quantization index feedback, MIMO matrix or vector quantization & quantization index feedback, channel covariance matrix feedback, Eigen matrix feedback (transmission of Eigen vectors and/or Eigen values of channel matrix), etc. At this time, the implicit CSI reporting scheme can reduce signal overhead as compared to the explicit CSI reporting scheme, since only necessary information is extracted and fed back.

At this time, in association with the CSI feedback method of a conventional wireless communication system, a UE receives a pilot signal (reference signal) for channel estimation from a base station and calculates and reports channel state information (CSI) to the base station. At this time, the base station transmits data to the UE based on the CSI fed back from the UE. At this time, in a wireless communication system, the CSI fed back by the UE may include a channel quality indicator (CQI), a precoding matrix index (PMI), a rank indicator (RI), etc.

At this time, CQI feedback may be radio channel quality information provided to the base station for the purpose of providing information regarding which modulation and coding scheme (MCS) is applied when the base station transmits data (for link adaptation). When radio quality between the base station and the UE is high, the UE may feed back a high CQI value and the base station may apply a relatively high modulation order and a low channel coding rate and transmit data. Otherwise, the UE may feed back a low CQI value and the base station may apply a relatively low modulation order and a high channel coding rate and transmit data.

In addition, PMI feedback may be feedback of preferred precoding matrix information provided to the base station for the purpose of providing information regarding which MIMO precoding is applied when the base station includes multiple antennas mounted therein. The UE may estimate a downlink MIMO channel between the base station and the UE from a pilot signal and provide information indicating which MIMO precoding is applied to the base station through PMI feedback. In a conventional wireless communication system, only linear MIMO precoding representable in a matrix in a configuration of a PMI was considered. At this time, the base station and the UE share a codebook composed of a plurality of precoding matrices and each MIMO precoding matrix in the codebook has a unique index. Accordingly, the UE may feed back an index corresponding to a most preferred MIMO precoding matrix in the codebook as PMI, thereby minimizing the amount of feedback information of the UE.

Lastly, RI feedback may be feedback of information on the number of preferred transport layers provided to the base station for the purpose of providing information on the number of transport layers preferred by the UE when each of the base station and the UE includes multiple antennas mounted therein and thus multilayer transmission through spatial multiplexing is possible. At this time, since the base station should know which precoding is applied to each layer according to the number of transport layers, the RI may be closely related with the PMI. For example, in configuration of PMI/RI feedback, a PMI codebook may be configured based on single-layer transmission and then a PMI may be defined and fed back per layer. However, in such a method, the amount of PMI/RI feedback information is significantly increased as the number of transport layers increases. Accordingly, in a conventional wireless communication system, a PMI codebook according to the number of transport layers was defined. That is, N matrices having a size of Nt×R may be defined in the codebook, for R-layer transmission (here, R denotes the number of layers, Nt denotes the number of transmit antenna ports, and N denotes the size of a codebook). At this time, the size of the codebook may be defined regardless of the number of transport layers. As a result, when the PMI/RI is defined in such a structure, the number R of transport layers becomes equal to the rank value of the precoding matrix (Nt×R matrix) and thus may be referred to as a rank indicator (RI).

In addition, in a conventional wireless communication system, CSI may be obtained in an overall system frequency region or some frequency regions (e.g., Wideband CSI, Subband CSI). Particularly, in a system using orthogonal frequency division multiple access (OFDMA) technology, CSI of some frequency regions (e.g., subband) preferred per UE may be obtained and fed back.

At this time, the below-described PMI/RI may not be limited to the index value of a precoding matrix represented in an Nt×R matrix and the rank value of a precoding matrix like a PMI/RI of a wireless communication system. In addition, the below-described PMI indicates preferred MIMO precoder information among MIMO precoders applicable to a transmission end and the precoder is not limited to a linear precoder represented in a matrix as in a conventional wireless system. In addition, the below-described RI has a broader meaning than the RI in the conventional wireless communication system and may include all feedback information indicating the number of preferred transport layers without being limited thereto.

In addition, for example, the PMI value may not include only one index. For example, in the conventional wireless communication system, a final PMI is divided into W1 which is a long term and/or wideband (WB) PMI and W2 which is a short term and/or subband (SB) PMI, thereby designing a PMI having a dual structure. At this time, when the final PMI is W, W=W1*W2 or W=W2*W1 may be defined. In addition, for example, in an LTE-A system, if the number of transmit antenna ports is 8 or if the number of transmit antenna ports is 4 and alternativeCodeBook EnabledFor4TX-r12=TRUE is configured through RRC signaling, a final MIMO precoding matrix may be derived by only combining two indices (WB PMI & SB PMI).

In addition, in a wireless communication system, in single user-MIMO (SU-MIMO), only data of one UE may be scheduled in the same time/frequency domain. That is, if information is transmitted to and received from one UE by MIMO, only scheduling information of one UE may be included in one time/frequency domain. In contrast, in multiuser-MIMO (MU-MIMO), data of a plurality of UEs may be scheduled together in one time/frequency domain. At this time, in MU-MIMO, the data is multiplexed in the same time/frequency domain, thereby obtaining additional gain. However, if the plurality of UEs is scheduled together, co-channel interference is generated by the UEs, thereby deteriorating system performance. At this time, the UE may feed CSI thereof back to the base station and the base station may schedule a user based on the CSI fed back from the plurality of UEs, thereby optimizing a system.

However, if a new UE is further scheduled in an SU-MIMO state or an MU-MIMO state, in a conventional wireless communication system, influence of interference between users generated by scheduling the new UE in the system may not be considered. That is, since only channel information considering SU-MIMO is fed back and the base station only checks the channel state of each user and cannot acquire information on interference to be experienced by each user in MU-MIMO, it may be difficult to reduce influence of interference between UEs. Accordingly, when SU-MIMO is switched to MU-MIMO or if MU-MIMO operates, multiplexing gain capable of being obtained by supporting multiple UEs needs to be sufficiently considered.

In this case, considering the above-mentioned situation, when a plurality of vehicles (or UEs, hereinafter referred to as vehicles for convenience of description) are present, the respective vehicles may feed back not only information about a combination of the number of DUs activated in the respective vehicles and positions of the DUs but also channel status information (CSI) to the base station (BS). That is, interference and Rx performance about other vehicles may be changed according to the number of DUs activated in each vehicle and positions of the DUs, such that it is necessary for each vehicle to feed back information about the activated DU to the BS. In this case, the BS may acquire an effective channel (or valid channel) for each vehicle on the basis of the received CSI and activated DU information, and may thus transmit data through the acquired effective channel. In this case, as described above, in the situation in which vehicles are densely concentrated, it is necessary for the BS to acquire more accurate channel information. A method for feeding back DU information by which the vehicle is activated will hereinafter be described in detail.

For example, the above-mentioned concept may be equally applied to single vehicle communication in which plural DUs are concentrated without departing from the scope or spirit of the present invention. In more detail, the structure and definition of each DU may be used in different ways. For example, the structure of the communication device (or system) may be classified into RRH, Modem (PHY/MAC/PDCP/RRC/NAS), and AP, each of which includes a RF stage. In this case, DU may be defined as one communication device (or system) or a common antenna unit according to the structure and function of each DU.

For example, when the DU is composed of only the RF stage or the RRH, the DU may perform the function of a common antenna unit. In contrast, when the DU has a structure of more than the RF stage, the DU may be defined as an independent communication device (or system). In this case, the structure of more than the RF stage may refer to one case in which the structure has some parts of the RRG and modem functions. Alternatively, the structure of more than the RF stage may also refer to the other case in which the structure has RRH, overall function of Modem, and AP function. That is, the DU is configured to perform a simple antenna function, and may be an antenna unit contained in the vehicle. In addition, the DU acting as a single communication device (or system) may be defined as a virtual UE.

In this case, for example, when the DU is defined as a single communication device (or system), the above-mentioned concept may also be equally applied to the situation in which virtual UEs are concentrated in single vehicle communication.

The DU may include a plurality of antennas. For example, when the DU acting as a single communication device (or system) is defined as a virtual UE, the on/off operations of plural antennas contained in the DU may be separately controlled by the DU acting as a virtual UE. That is, on the condition that the respective DUs are concentrated as virtual UEs in a single vehicle communication system, a method for performing communication between the DUs may be needed. In this case, each of the DUs may include a plurality of antennas. In addition, each Du may separately control the on/off operations of each of the antennas.

However, although the following description will hereinafter be described centering around the vehicle including the DU, the scope and spirit of the present invention are not limited thereto, and the scope of the present invention may also be applied to a UE having a plurality of antennas or to other devices (each having a plurality of antennas) configured to operate based on the plurality of antennas. In addition, the following concept may also be equally applied to an exemplary case in which the DU operates as a virtual UE in single vehicle communication, without being limited thereto.

In addition, the following concept may also be equally applied to each DU contained in a single vehicle.

Figure 10:
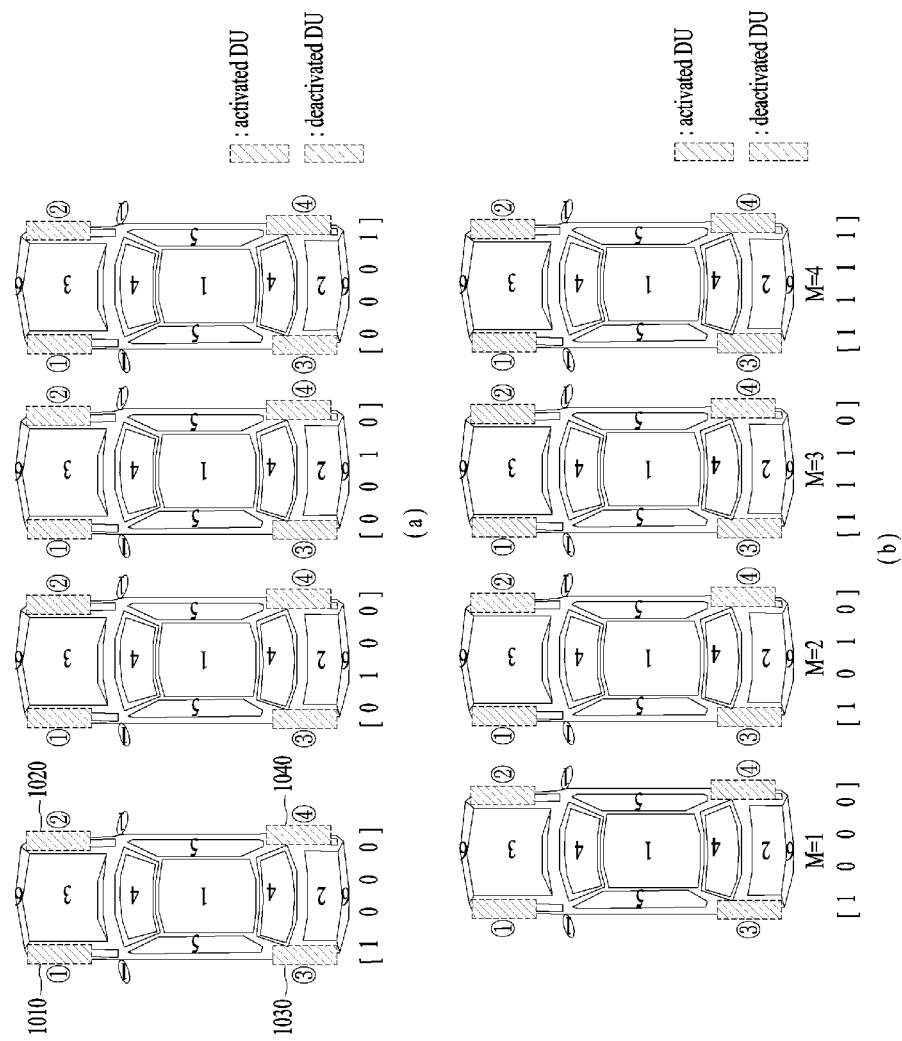
FIG. 10 is a diagram showing an example of a DU selection combination according to an embodiment of the present invention.

FIG. 10 is a diagram showing an example of a DU selection combination according to an embodiment of the present invention. As described above, an implicit CSI reporting scheme or an explicit CSI reporting scheme may be used as a CSI reporting scheme. At this time, if a plurality of DUs is included in a vehicle and activation of DUs is selectable, effective channel information may be changed according to the number and locations of activated DUs.

More specifically, in a conventional communication system, if a plurality of antennas is present and all antennas are activated, a UE may feed back CSI. However, as described above, if a plurality of vehicles is concentrated or if a plurality of UEs or devices is concentrated, cooperative communication may be performed in consideration of mutual interference. At this time, each UE may select DUs to be activated from among the plurality of DUs included therein, thereby reducing interference with the other vehicles or UEs. At this time, channel information to be reported by the vehicle may be changed according to the number and locations of activated DUs among the plurality of DUs and thus a channel information reporting method considering the same may be necessary.

At this time, for example, the channel information reported by the vehicle may include channel state information and DU index set information combined according to the number and locations of activated DUs among the plurality of DUs included in the vehicle. At this time, the channel state information may be explicitly reported in consideration of the DU index set information. At this time, for example, the explicitly reported channel state information may include at least one of the channel coefficient, quantization & quantization index feedback, MIMO matrix or vector quantization & quantization index feedback, channel covariance matrix feedback and Eigen matrix feedback (transmission of Eigen vectors and/or Eigen values of channel matrix). In addition, for example, the channel information fed back by the vehicle may include at least one of the DU index set information and the channel state information. That is, the channel information fed back by the vehicle may include both or one of the DU index set information and the channel state information, without being limited to the above-described embodiment.

In addition, the channel information fed back by the vehicle may include explicit channel state information in consideration of the DU index set as described above, without being limited thereto. For example, the vehicle may report the DU index set information and implicit channel state information to the base station and the base station may acquire final effective channel information using the implicit channel state information and the DU index set information.

In addition, the base station may receive the channel information of each of the plurality of vehicles. That is, the base station may receive the DU index set information and the channel state information fed back by each of the plurality of vehicles. At this time, the base station may acquire effective channel information using the received DU index set information and channel state information. The base station may transmit data to the vehicles using the acquired effective channel information.

At this time, the DU index set information may differ between the vehicles. As described above, the DU index set information may be differently set based on the number and locations of activated DUs among the plurality of DUs included in the vehicle.

For example, referring to FIG. 10(a), the vehicle may include four DUs 1010, 1020, 1030 and 1040 at corner regions thereof. At this time, the number and locations of DUs included in the vehicle may be differently set and is not limited to the above-described embodiment. In addition, for example, each vehicle may feed the number and locations of DUs included therein back to the base station. In addition, for example, each vehicle may feed information on the number and locations of activated DUs among the DUs included therein back to the base station. In addition, for example, the base station may acquire the DU information of each vehicle through higher layer signaling or another path, without being limited to the above-described embodiment.

At this time, for example, FIG. 10(a) shows the case where only one of the four DUs 1010, 1020, 1030 and 1040 included in the vehicle is activated. At this time, different combinations may be configured according to selected DUs. More specifically, whether each of the DUs 1010, 1020, 1030 and 1040 included in the vehicle is activated may be indicated through a matrix or an index. At this time, if only the DU located at the front left side of the vehicle is activated, the DU index may be [1 0 0 0]. If only one DU included in the vehicle is activated using the same method, the DU index may be represented by [0 1 0 0], [0 0 1 0] or [0 0 0 1].

At this time, for example, the DU index set information may include the above-described four pieces of DU index information. In addition, for example, the vehicle may feed information indicating that only one of the four DUs 1010, 1020, 1030 and 1040 is activated back to the base station. At this time, the vehicle may include the four pieces of DU index information in the DU index set information and feed the DU index set information back to the base station along with the channel state information. At this time, the base station may acquire effective channel information based on the DU index information and perform downlink data transmission.

In addition, for example, the vehicle may feed the DU index set information considering both the number and locations of DUs included therein back to the base station. At this time, for example, the number of cases of selecting $M_i (M_i \leq N_i)$ DUs to be activated among the DUs included in one vehicle is shown in Equation 11 below.

$$_{N_i}C_{M_i} \quad \text{[Equation 11]}$$

Accordingly, the total number of cases of DU combinations selectable from one vehicle is shown in Equation 12 below.

$$\sum_{M_i=0}^{N_i} {}_{N_i}C_{M_i} = 2^{N_i} \quad \text{[Equation 12]}$$

In addition, for example, if $M_i=0$, the vehicle may be deactivated not to cause interference with the other vehicles. At this time, for example, the vehicle may feed the DU index set information including $2^{N_i}$ pieces of DU index information back to the base station. The base station may determine an effective channel using the fed-back DU index set information and channel state information.

In addition, for example, FIG. 10(b) shows DU index information which is differently set according to the number and locations of activated DUs among the four DUs 1010, 1020, 1030 and 1040 of the vehicle. That is, the DU index may be determined based on the number and locations of activated DUs among the DUs included in the vehicle and the DU index information may be fed back to the base station as DU index set information.

At this time, for example, in FIG. 10(a), only one of the four DUs may be activated in one vehicle. At this time, as described above, the DU index set may be given as {[1 0 0 0], [0 1 0 0], [0 0 1 0], [0 0 0 1]}. At this time, the vehicle may transmit the channel state information to the base station as an explicit CSI report. At this time, for example, the explicit CSI report may include MIMO matrix quantization. At this time, MIMO matrix quantization is shown in Equation 13 below.

$$H = \begin{bmatrix} h_1 \\ h_2 \\ \vdots \\ h_{N_i} \end{bmatrix} \quad \text{[Equation 13]}$$

At this time, $h_i$ elements configuring the matrix may be a scalar value by the number of antennas in each DU, quantization resolution, etc. In addition, for example, $h_i$ may be a row vector or a column vector. At this time, for example, if $h_i$ is represented in the form of a column vector, a MIMO matrix may be represented by horizontally stacking $h_i$, not vertically stacking $h_i$ as in Equation 13. That is, the base station, which has received the explicitly reported CSI and the selectable DU index set, may combine and use the effective channel information of the vehicle using the information for downlink transmission. At this time, for example, in Equation 13, the effective channel information capable of being extracted from explicit feedback and the DU index set [0 1 0 0] may become $H_{eff}=[h_2]$. That is, the base station may extract some (rows or columns) of the explicit CSI based on the DU index set information fed back from each vehicle, form effective channel information of each vehicle and perform data transmission using the effective channel information.

Figure 11:
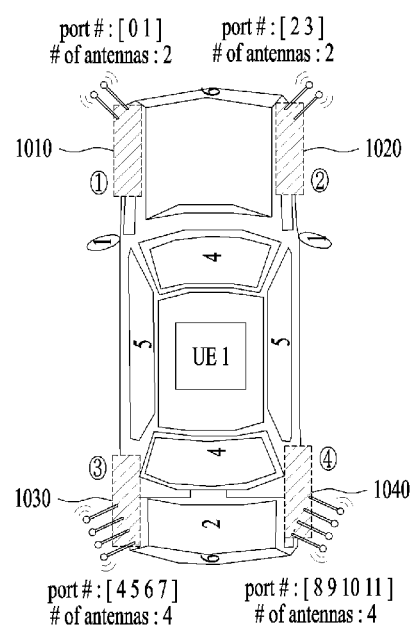
FIG. 11 is a diagram showing a DU including a plurality of antenna ports according to an embodiment of the present invention.

FIG. 11 is a diagram showing a DU including a plurality of antenna ports according to an embodiment of the present invention. As described above, each vehicle may include DU index set information and channel state information in channel information and feed the channel information back to the base station.

At this time, for example, the DU index set may be configured as antenna port group (sub grouping or antenna port grouping) information per DU.

More specifically, referring to FIG. 11, one vehicle may include four DUs composed of 2/2/4/4 physical antennas. At this time, the total number of physical antennas included in each DU may be 12. At this time, for example, the vehicle may generate channel state information based on the total number of physical antennas. At the same time, the vehicle may feed information indicating the antenna port of the DU, to which each physical antenna is mapped, back to the base station through the DU index set information.

For example, the vehicle may include information such as DU1 (port #={0,1}, number of antennas=2), DU2 (port #={2,3}, number of antennas=2) in the DU index set and feed the information back to the base station. At this time, the base station may map the antenna port index using the received DU index set information and the channel state information and transmit data while controlling interference between the vehicles.

Figure 12:
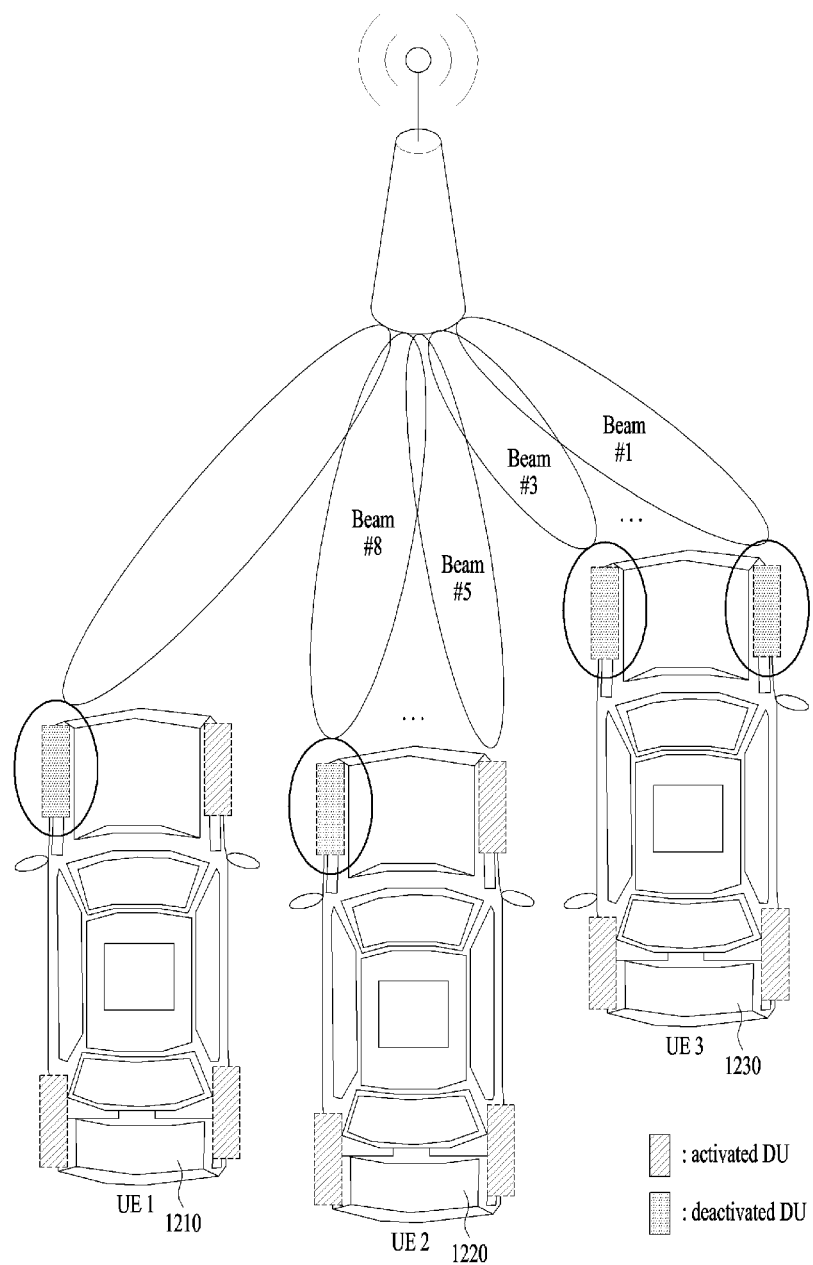
FIG. 12 is a diagram showing a method of forming channel information in consideration of a beam direction when a plurality of vehicles is adjacent to one another.

FIG. 12 is a diagram showing a method of forming channel information in consideration of a beam direction when a plurality of vehicles is adjacent to one another.

As described above, channel information reported by a vehicle may include DU index set information combined according to the number and locations of DUs activated among a plurality of DUs included in the vehicle, and channel state information. In association with the above-described configuration, all DUs being always activated in the vehicle without DU selection may be equal to an existing MU-MIMO situation. However, CSI information may be changed according to the number and locations of DUs activated in one vehicle. That is, as the above-described CSI information, PMI, CQI and RI information may be changed according to the number and locations of DUs activated in one vehicle.

In addition, as described above, since a plurality of vehicles is densely located, strength and influence of an interference signal therebetween may be changed according to combinations of the number and locations of DUs activated in each vehicle. At this time, a new channel state reporting method may be necessary to reduce mutual interference or perform cooperative communication in a dense environment. That is, a method of configuring and calculating channel information in consideration of interference between adjacent vehicles may be necessary and channel information may be reported only or along with the above-described DU index information.

In addition, for example, an environment in which the plurality of vehicles is densely located may mean that vehicles greater in number than a reference number of vehicles are located within a reference distance from a vehicle. In addition, the meaning of the dense environment may be differently set based on the distance between and number of vehicles in an environment in which a plurality of vehicles is located, without being limited to the above-described embodiments. In addition, for example, the dense environment may mean that there is a vehicle group including a plurality of vehicles. That is, the vehicles included in the same vehicle group may have the following configuration for the channel information report in the dense environment, without being limited to the above-described embodiments.

In addition, the dense environment may mean that a plurality of DUs is densely located in single-vehicle communication. At this time, as described above, the DU is a virtual terminal and may be recognized as one independent communication apparatus (or system). The present invention is equally applicable to single-vehicle communication in which a plurality of independent communication apparatuses (or systems) is densely located.

In addition, for example, if the DU is a virtual terminal and is recognized in single-vehicle communication, the above-described distance and number may be differently set. That is, the vehicle group including the plurality of vehicles may correspond to single-vehicle communication including a plurality of DUs. In addition, each of the plurality of DUs included in the vehicle group may correspond to the DU in single-vehicle communication. In addition, the plurality of DUs included in the vehicle may correspond to the plurality of antennas included in a virtual terminal, without being limited to the above-described embodiments.

Although vehicles each including a DU having only an antenna function are densely located for convenience of description, the present invention is not limited to the above-described embodiments.

At this time, for example, channel information may be composed of channel information sets. More specifically, the channel information set may be individual information according to combinations of the number and locations of activated DUs among the plurality of DUs included in the vehicle. That is, channel information determined by the number and locations of activated DUs may be a channel information set. More specifically, as shown in Equation 12 above, information on the number of cases of selecting $M_i$ ($M_i \leq N_i$) DUs to be activated among from $N_i$ DUs in one vehicle may be a channel information set. At this time, for example, for a vehicle including $N_i$ DUs, $2^{N_i}$ channel information sets may be formed based on Equation 12. At this time, for example, all or some of the plurality of channel information sets may be included and fed back in channel information. That is, the channel information may be composed of a union of channel information sets.

At this time, for example, the channel information sets included in the channel information may be determined in consideration of adjacent UEs. In addition, for example, if the number of DUs activated in the vehicle is predetermined, only channel information sets for possible combinations based on a fixed number of DUs may be included and fed back in channel information. That is, the channel information sets included in the channel information may be variously set according to the number and locations of activated DUs, without being limited to the above-described embodiments.

In addition, for example, the channel information set may include information on a PMI, a CQI and an RI. That is, a beam used for communication with an eNB may be differently set according to the number and locations of DUs activated in the vehicle. Accordingly, each channel information set for each combination according to the number and locations of DUs may include information on a PMI, a CQI and an RI. In addition, the channel information set may include at least one MU-CQI. At this time, for example, the MU-CQI may mean that CQIs for combinations according to the number of users simultaneously scheduled to sufficiently obtain multiplexing gain in MU-MIMO, the number of simultaneously transmitted streams or codewords is calculated and the calculated CQIs are transmitted to the eNB. At this time, information on an MU-CQI considering a relationship between adjacent UEs may be included and fed back in the channel information set in consideration of activated DU selection combinations even in the vehicle.

As another example, the MU-CQI may be included and transmitted in the channel information set only when a DU selection combination is fixed. That is, if the number and locations of activated DUs are fixed, information on the MU-CQI may be included in the channel information set. To this end, the vehicle may perform communication with the eNB in consideration of a relation with adjacent vehicles in the current DU selection combination. The MU-CQI may be included in channel information even in the other cases by needs of the vehicle or the eNB, without being limited to the above-described embodiments.

As another example, the channel information set may include at least one of a best companion beam and a worst companion beam. More specifically, the vehicle may feed back a preferred PMI thereof and feed back precoder information capable of generating least or most interference therewith when the PMI is used as a best companion beam or a worst companion beam. That is, as precoder information, precoder information determined as being most suitable and precoder information determined as being most unsuitable may be included and fed back in the channel information set.

In addition, for example, information on the best companion beam and the worst companion beam may be included and fed back in the channel information set only when the DU selection combination is fixed in the vehicle. That is, as the case where the number and locations of activated DUs are fixed, the information on the best companion beam and the worst companion beam may be included in the channel information set only when information on the number and locations of antennas for transmitting and receiving the beam in the vehicle is determined.

The information on the best companion beam and the worst companion beam may be included in channel information in the other cases by needs of the vehicle or the eNB, without being limited to the above-described embodiments.

That is, as described above, the information included in the channel information set may be set differently from that of the existing MU-MIMO. At this time, as described above, if DUs are provided in one vehicle or UE and there is a plurality of selectable combinations according to the number and locations of activated DUs, necessary information may be derived from properties in which a received beam direction may be changed and thus information different from existing information may be included.

In addition, the present invention is applicable to a device including a plurality of antenna units as one UE or device. In addition, the present invention is applicable not only to an apparatus having mobility but also to a fixed device, without being limited to the above-described embodiments.

As another example, DU selection combinations in each vehicle need to be determined in consideration of the strength and influence of an interference signal between vehicles in a situation in which a plurality of vehicles performs communication. In addition, a method of determining the channel information set in consideration of information which may be changed by a beam direction or a precoder index in an environment in which a plurality of vehicles is present may be necessary and thus will be described below.

At this time, for example, a plurality of vehicles being adjacent to one another may correspond to a distance between vehicles being equal to or less than a threshold distance. Alternatively, this may mean that a predetermined number or more of vehicles is included within the threshold distance from a reference vehicle. As another example, this is applicable to UEs included in the same vehicle group. In addition, the above-described features are applicable to the case where vehicles are densely located to influence one another, without being limited to the above-described embodiments.

For example, the information on the best companion beam and the worst companion beam may be determined in consideration of candidate beam information or precoder information of adjacent vehicles. In addition, for example, the above-described MU-CQI may be determined in consideration of candidate beam information or precoder information of adjacent vehicles.

More specifically, referring to FIG. 12, a first vehicle 1110, a second vehicle 1120 and a third vehicle 1130 may be present as adjacent vehicles. At this time, for example, activation of only one DU located at the left upper side may be considered as the DU selection combination of the first vehicle 1110. At this time, information on a best companion beam and a worst companion beam may be determined in consideration of beam information selectable in the second vehicle 1120 and the third vehicle 1130 as adjacent vehicles. In addition, information on an MU-CQI may be determined.

At this time, for example, the above-described beam information may be represented as an index and the first vehicle 1110 may acquire information on the adjacent vehicles 1120 and 1130 based on the index information.

For example, the first vehicle 1110 may determine a preferred beam direction in a state in which only one DU located at the left upper side is activated. At this time, one or a plurality of MU-CQIs or best/worst companion beam information may be calculated while combining beams in a selectable beam direction range of the second vehicle 1120 and the third vehicle 1130.

For example, the first vehicle 1110 may consider combinations such as (5,1), (5,2), (5,3) . . . (8,1), (8,2) and (8,3) as combinations of the beam directions of the second vehicle 1120 and the third vehicle 1130. That is, as beam information, the beam information assigned to the second vehicle 1120 and the third vehicle 1130 may be provided as index combinations. Therefore, a plurality of MU-CQIs and/or best/worst companion beam information may be calculated using the beam information of each vehicle.

In addition, for example, according to the beam direction range, the plurality of MU-CQIs and/or best/worst companion beam information may be included and provided as one or a plurality of channel information sets. At this time, for example, when an actual channel information set is configured, only some of the plurality of pieces of calculable channel information may be selected and included, without being limited to the above-described embodiments.

As another example, various communication systems may be used when each vehicle provides and feeds back the above-described beam direction information or precoder information.

More specifically, each of the adjacent vehicles may feed the beam direction range information selectable thereby back to the eNB and the eNB may transmit the received information to all adjacent vehicles using a broadcast method. As another example, the above-described information may be transmitted to only a representative vehicle of a vehicle group including a plurality of vehicles, without being limited to the above-described embodiments.

As another example, each vehicle may exchange beam direction information selectable thereby with adjacent vehicles through direction communication without passing through the eNB. At this time, for example, vehicle-to-vehicle communication may be used. As another example, if vehicles are included in the same vehicle group, direct communication may be performed without being limited to the above-described embodiments.

That is, each vehicle may acquire channel information from adjacent or peripheral vehicles in response to the beam direction information in an environment in which a plurality of vehicles is densely located and thus select a best beam or precoder, without being limited to the above-described embodiments.

In addition, for example, the channel information including the above-described channel information set may be periodically or a periodically fed back to the eNB through a physical uplink control channel (PUCCH) and/or a physical uplink shared channel (PUSCH). In addition, although the above-described technology is described based on communication among a plurality of vehicles and a vehicular antenna array (unit), the present invention is not limited to the proposed technology and the same method is applicable to a general multi-user MIMO system.

Figure 13:
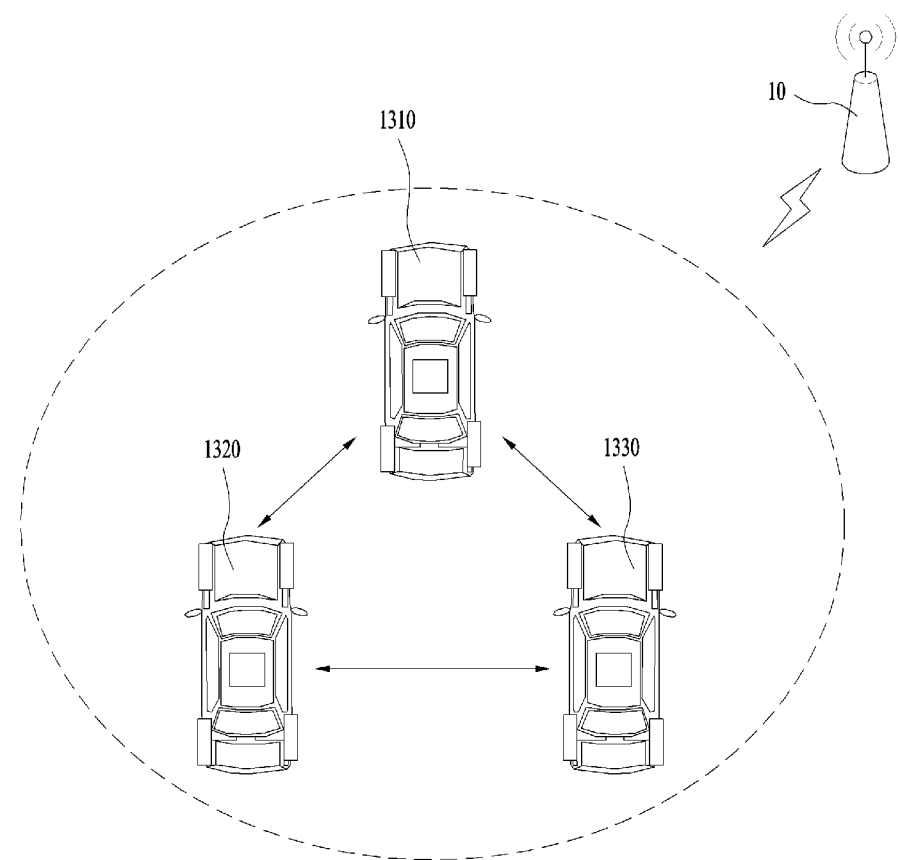
FIG. 13 is a conceptual diagram illustrating a method for allowing UEs contained in a group to autonomously select their DUs.

FIG. 13 is a conceptual diagram illustrating a method for allowing vehicles (or UEs) contained in a group to autonomously select their DUs. As described above, the MU-MIMO technology is of importance to acquisition of a maximum independent channel in a manner that beams between plural UEs (or vehicles) are separated from each other. In this case, for example, assuming that the plural UEs have similar RF channel characteristics (e.g., high channel correlation), the MU-MIMO technology may have difficulty in application. For example, the above environment may be a stadium environment in which UEs are concentrated in a small region. In another example, as described above, when vehicles are concentrated in a small region, it may be difficult to acquire a desired channel.

In this case, for example, as described above, each vehicle may include a plurality of DUs, and may control the number of activated DUs and the positions of the DUs. In this case, although the above-mentioned description has disclosed a method for reporting available combination information or channel information in consideration of the number of DUs and the positions of the DUs, the method for selecting the number of activated DUs and the position of the activated DUs will hereinafter be described.

In this case, each vehicle must control the number and position of activated DUs, such that the vehicle must receive not only a beam capable of being received by contiguous vehicles but also a beam having a maximally independent path experiencing different clusters, resulting in acquisition of higher performance That is, as a method for forming a beam in each vehicle in consideration of the situation in which several vehicles are concentrated, a method for selecting the number of activated DUs and the position of activated DUs is needed.

In this case, for example, contiguous vehicles or grouped vehicles may inform all or some of vehicles other than the contiguous or grouped vehicles of channel spatial information about the available DU selection combinations. In this case, for example, as described above, contiguous vehicles may denote the environment in which vehicles are concentrated, and may also denote an exemplary case in which a threshold number of vehicles are present within a threshold distance on the basis of the vehicle position. In addition, the grouped vehicles may be a vehicle group formed by BS or V2V communication. In this case, a subject that configures the group may be a vehicle. Alternatively, the group may be established by the BS, and the scope or spirit of the present invention is not limited thereto. That is, the group may denote a vehicle group in which several vehicles are concentrated, without being limited thereto.

In addition, for example, DU selection may denote the number and position of DUs activated in each vehicle, as described above. That is, the DU selection combination available in a vehicle equipped with $N_i$ DUs may denote information about $2^{N_i}$ combinations as shown in Equation 12. In this case, the channel spatial information may be channel information about the number and positions of DUs on the basis of $2^{N_i}$ combinations, and each vehicle may inform other vehicles (or UEs) of all or some of channel information based on DU selection.

In this case, for example, the respective vehicles may share channel spatial information of the group or contiguous vehicles with each other through broadcasting/multicasting.

In more detail, as shown in FIG. 13, one group may include a first vehicle 1310, a second vehicle 1320, and a third vehicle 1330. In this case, the number of vehicles contained in a single group is only exemplary, without being limited thereto.

In this case, the respective vehicles (1310, 1320, 1330) may exchange channel spatial information of their available DU selection combinations with one another through broadcasting/multicasting. For example, the first vehicle 1310 may inform the second vehicle 1320 and the third vehicle 1330 of its own channel spatial information based on the DU selection combination through broadcasting/multicasting. Likewise, the second vehicle 1320 and the third vehicle 1330 may also inform other vehicles of their channel spatial information based on the DU selection combination.

In this case, for example, channel spatial information about all the available combinations used as the DU selection combinations may be transmitted to each vehicle. In another example, only channel spatial information about the DU selection combination preferred by each vehicle may be transmitted through each vehicle in consideration of overhead. In this case, the respective vehicles (1310, 1320, 1330) may autonomously select their DUs capable of maximizing channel independency using the channel spatial information received from other vehicles. That is, each of the first vehicle 1310, the second vehicle 1320, and the third vehicle 1330 may receive channel spatial information about other vehicles of the concentrated region or group, thereby directly performing DU selection. That is, the respective vehicles (1310, 1320, 1330) may directly determine the number and positions of activated DUs using channel information about other vehicles. As a result, the respective vehicles (1310, 1320, 1330) in the concentrated region may more easily acquire the channel space.

Figure 14:
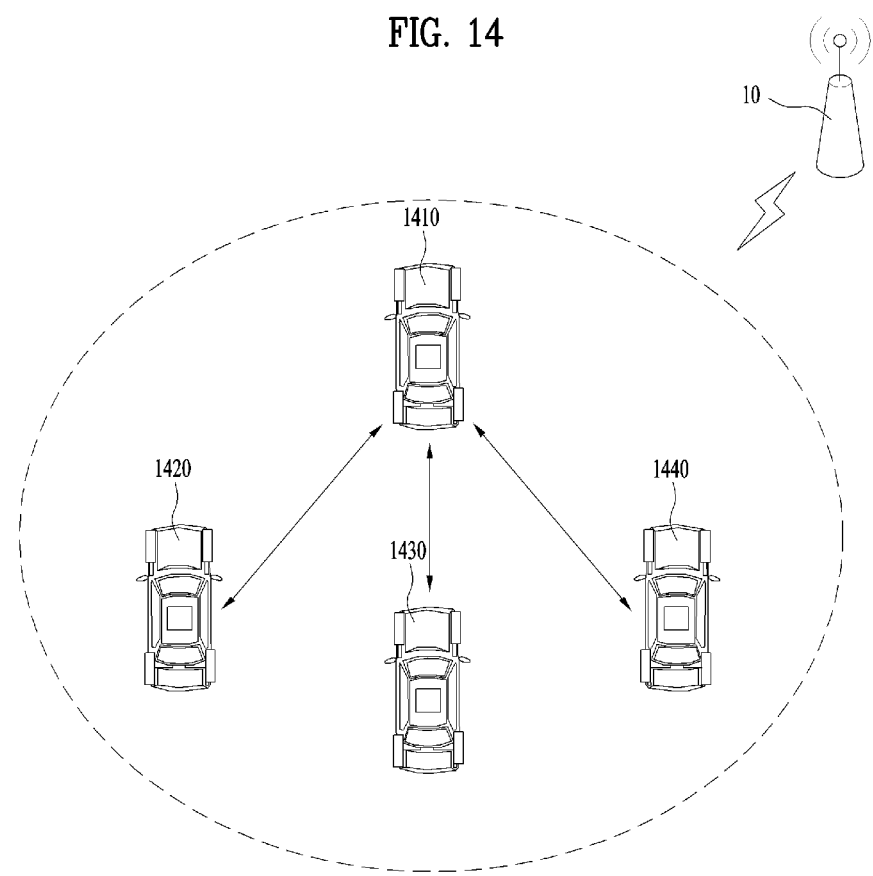
FIG. 14 is a conceptual diagram illustrating a method for allowing UEs contained in a group to perform DU selection on the basis of a header UE.

FIG. 14 is a conceptual diagram illustrating a method for allowing vehicles (or UEs) contained in a group to perform DU selection on the basis of a header vehicle (or UE).

As described above, the respective vehicles may exchange mutual channel spatial information through broadcasting/multicasting, and may autonomously perform DU selection.

In another example, each vehicle contained in the concentrated region or group may transmit its own channel spatial information only to a specific vehicle contained in the group. In this case, the specific vehicle may be a header vehicle contained in the group. In addition, the specific vehicle may correspond to a specific vehicle type, and may be a predetermined-type vehicle. In this case, for example, the specific vehicle type must perform a plurality of processes, and the specific vehicle may be a high-performance vehicle. For example, the specific vehicle may be decided by the BS. The specific vehicle may be decided in a group through V2V communication contained in the group.

The specific vehicle may be a vehicle that is capable of receiving channel spatial information from other vehicles contained in the group, without being limited thereto. In this case, in the same manner as described above, the channel spatial information may include information in which all DU selection combinations available in the respective vehicles are considered, and may transmit the information to a specific vehicle. In addition, for example, only information about selection of a DU preferred by each vehicle may be used as channel spatial information in consideration of overhead, and may then be transmitted to a specific vehicle. Thereafter, a specific vehicle (or a header vehicle) may decide DU selection about all vehicles contained in the group on the basis of the received channel spatial information, and may inform each vehicle of the decided DU selection information. That is, the header vehicle contained in the vehicle group may receive channel spatial information about the remaining vehicles contained in the group, and may decide DU selection about all vehicles contained in the group. As a result, the most appropriate channel optimum for each vehicle contained in the group can be acquired in consideration of the relationship between all vehicles contained in the group.

Referring to FIG. 14, the first vehicle 1410 may be a header vehicle. In this case, the first vehicle 1410 may receive channel spatial information from the second vehicle 1420, the third vehicle 1430, and the fourth vehicle 1440. Thereafter, the first vehicle 1410 may decide DU selection about all vehicles (1410, 1420, 1430, 1440) using channel spatial information of each of the first vehicle 1410, the second vehicle 1420, the third vehicle 1430, and the fourth vehicle 1440. In this case, the first vehicle 1410 may transmit DU selection information about the second vehicle 1420 to the second vehicle 1420. In addition, the first vehicle 1410 may transmit DU selection information about the third vehicle 1430 to the third vehicle 1430. The first vehicle 1410 may transmit DU selection information about the fourth vehicle 1440 to the fourth vehicle 1440. That is, the first vehicle 1410 acting as a header vehicle may transmit DU selection information of each vehicle to the corresponding vehicle.

In this case, the respective vehicles (1420, 1430, 1440) having received DU selection information from the header vehicle may perform DU selection according to the received DU selection information. As a result, DU selection may be performed in a manner that channel spaces for vehicles contained in the group or concentrated region can be easily acquired. That is, a combination of the number and positions of activated DUs about the respective vehicles contained in the group can be selected in a manner that the spatial correlation between channels experienced by the respective vehicles can be maximally reduced. For example, a plurality of header groups may be present in a single group in consideration of overhead, without being limited thereto.

The above-mentioned channel spatial information will hereinafter be described. In this case, the following channel spatial information can be commonly applied not only to one case in which vehicles of the group autonomously perform DU selection through broadcasting/multicasting, but also to the other case in which the header vehicle performs DU selection of all vehicles contained in the group.

In more detail, the channel spatial information may be established based on the DU selection combinations selected by the respective vehicles, and may include directivity information about the ray and/or the beam. In this case, for example, the channel spatial information may include at least one of Angle of Departure (AoD), PMI (precoding matrix index), AoD indicator, Angular spread of clusters, preferred Tx beam indexes, and Transmit (Tx) correlation matrix (or channel covariance matrix). That is, factors for discriminating between channels of the respective vehicles may be used in the environment in which several vehicles are concentrated. In this case, the above-mentioned structure is only exemplary, without being limited thereto.

For example, in association with the channel spatial information, when the final precoder used by the respective vehicles is composed of two or more PMIs, PMIs exchanged between the vehicles or PMIs transmitted to the header vehicle may be some of the PMIs constructing the final precoder. For example, the PMI may be a PMI about a broad beam or a PMI having a relatively long feedback report period. The above-mentioned PMI information may be information about characteristics capable of being maintained for a relatively long time. Information exchanged between the respective vehicles or channel spatial information reported to the header vehicle may include PMI information that is unchanged for a predetermined time.

In addition, when the preferred Tx beam index information is shared as the channel spatial information, the respective vehicles may share a plurality of indexes with one another as necessary. For example, the respective vehicles may share or report a plurality of higher indexes in descending numerical order of selection reference values (or in descending numerical order of preferred orders). That is, in the case of selecting DU selection, the preferred information or higher priority information are first shared, such that overhead can be reduced and DU selection can be efficiently performed. In addition, when the respective vehicles share the transmit (Tx) correlation matrix, the vehicle may share the Tx correlation matrix and the DU selection candidate set capable of being modified with contiguous vehicles or the header vehicle. In more detail, the respective vehicles acting as a DU selectable combination may have a candidate group about DU selection available for each vehicle. In this case, each vehicle may provide not only information about the Tx correlation matrix but also the DU selection candidate set information, such that the most appropriate DU selection may be achieved by each vehicle of the group.

In another example, when the channel spatial information is the preferred Tx beam index, the index may be selected in a manner that the distance to the beam index reaches the longest distance. For example, the above-mentioned selection may be performed by the header vehicle. In another example, when the shared information is AOD, this means that the AOD has a predetermined reference value or higher, the Tx beam direction having lower correlation in proportion to the increasing difference in AOD values is formed. In this case, a reference value for estimating whether correlation is high or low according to the AOD value may be preset or may be decided by the BS, such that each vehicle is pre-notified of the preset reference value or the decided reference value. That is, DU selection for each vehicle may be decided in a manner that information about the separable angle for each vehicle can satisfy a condition of a predetermined reference value or higher or the Tx beam direction having low correlation between the vehicles can be considered.

In this case, although the above-mentioned embodiment has been disclosed centering around the vehicle, the above-mentioned concept may also be equally applied to respective UEs or devices.

In another example, when the vehicle or UE moves from one place to another place, the peripheral environment such as topography may be changed. Generally, MU-MIMO may be applied only to UEs moving at a low speed. That is, the above-mentioned embodiments may be used in consideration of the situation in which channel spatial characteristics between the vehicle (or UE) and the BS are not rapidly changed.

For example, exchange or transmission of the channel spatial information may be achieved for a very long period of time. In addition, triggering for the above-mentioned embodiments may be performed only when a predetermined event for the group has occurred. For example, as an exemplary case in which group information is changed, the case of changing the number of vehicles contained in the group may correspond to the case of event occurrence. That is, an exemplary case in which information about the vehicles contained in the group is changed so that channel adjusting is needed may refer to the event. However, the scope or spirit of the present invention is not limited thereto. In this case, information may be exchanged or reported in a manner that the above-mentioned DU selection can be achieved only in the case of event occurrence.

Figure 15:
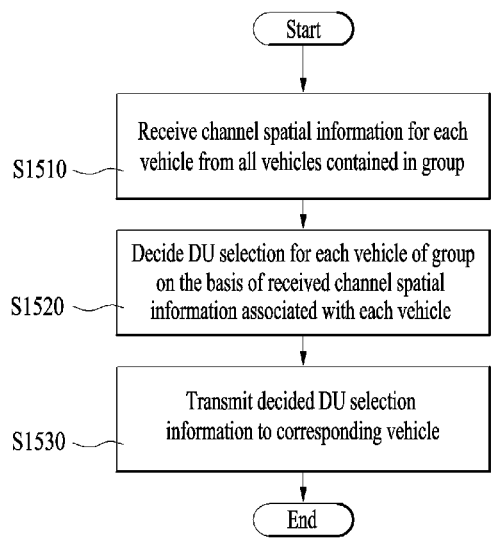
FIG. 15 is a flowchart illustrating a method for selecting a distributed unit (DU) according to an embodiment of the present invention.

FIG. 15 is a flowchart illustrating a method for selecting a distributed unit (DU) according to an embodiment of the present invention.

Referring to FIG. 15, a single vehicle contained in the group may receive channel spatial information for each vehicle from all vehicles (or UEs) contained in the group (S1510). In this case, as shown in FIGS. 8 to 14, one vehicle may be a specific vehicle or header vehicle contained in the group. In this case, for example, the header vehicle may be decided by vehicles contained in the group. For example, the header vehicle may be decided by the BS. For example, the channel spatial information may be based on DU selection capable of being combined in the respective vehicles. In this case, DU selection may denote the number and position of DUs activated in each vehicle, as described above.

Subsequently, a single vehicle contained in the group may determine DU selection for each vehicle of the group on the basis of the received channel spatial information associated with each vehicle (S1520). In this case, as shown in FIGS. 8 to 14, a single vehicle of the group may decide DU selection about all vehicles contained in the group. For example, the header vehicle may decide DU selection for each vehicle in a manner that spatial correlation of channels experienced by the respective vehicles contained in the group can be maximally reduced. That is, the header vehicle may perform DU selection for each vehicle in the direction in which channel independency of each vehicle of the group can be guaranteed.

After that, a single vehicle contained in the group may transmit the decided DU selection information to the corresponding vehicle (S1530). In this case, as shown in FIGS. 8 to 14, the respective vehicles of the group may perform DU selection on the basis of DU selection information received from the header vehicle.

Figure 16:
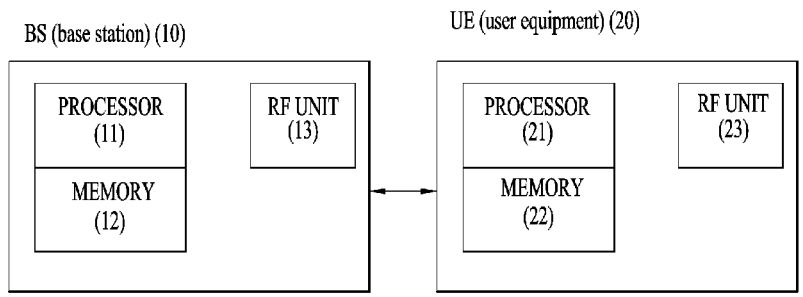
FIG. 16 is a block diagram showing a UE apparatus and a base station apparatus according to an embodiment of the present invention.

FIG. 16 is a block diagram showing a UE apparatus and a base station apparatus according to an embodiment of the present invention.

The wireless communication system may include a base station 10 and at least one UE 20. At this time, on downlink, the base station 10 may be a transmission device and the UE 20 may be a reception device. In addition, on uplink, the UE 20 may be a transmission device and the base station 10 may be a reception device. At this time, the base station apparatus 10 may include a processor 11 for controlling units, a memory 12 for storing information and a radio frequency (RF) unit 13 for transmitting and receiving signals. At this time, the processor 11 of the base station apparatus 10 may perform the methods or procedures described above with reference to FIGS. 1 to 12. The memory 12 of the base station apparatus 10 may be connected to the processor 11 to store a variety of information controlled by the processor 11. In addition, the base station apparatus 10 may perform communication with an external device using the RF unit 13. At this time, the external device may be a UE apparatus. In addition, for example, the external device may be the above-described vehicle. In addition, for example, the external device may be a fixed apparatus or device, without being limited to the above-described embodiments. That is, the base station apparatus 10 may perform communication with another device as an external device, without being limited to the above-described embodiments.

In addition, the UE apparatus 20 may include a processor 21, a memory 22 and an RF unit 23. The processor 21 of the UE apparatus 20 may perform the methods or procedures described above with reference to FIGS. 1 to 12. The memory 22 of the UE apparatus 20 may be connected to the processor 21 to store a variety of information controlled by the processor 21. In addition, the UE apparatus 20 may perform communication with an external device using the RF unit 23. At this time, the external device may be a base station apparatus 10. In addition, for example, the external device may be the above-described vehicle. In addition, for example, the external device may be a fixed apparatus or device, without being limited to the above-described embodiments. That is, the UE apparatus 20 may perform communication with another device as an external device, without being limited to the above-described embodiments.

At this time, for example, the base station apparatus 10 and/or the UE apparatus 20 may include one or a plurality of antennas. At this time, for example, if at least one of the base station apparatus 10 and the UE apparatus 20 includes a plurality of antennas, the wireless communication system may be the above-described MIMO system.

In addition, for example, the above-mentioned UE apparatus 20 may be a structure corresponding to the above-mentioned vehicle. That is, the single vehicle may be a single UE apparatus 20, and respective constituent elements of the UE apparatus 20 may be contained in the vehicle as necessary.

The embodiments according to the present invention can be implemented by various means, for example, hardware, firmware, software, or combinations thereof.

In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

INDUSTRIAL APPLICABILITY

Although an example of applying a method of transmitting and receiving channel information in a vehicular communication system and an apparatus therefor to a 3GPP LTE system is described, the present invention is applicable to various wireless communication systems in addition to the 3GPP LTE system.

The invention claimed is:
1. A method for selecting a distributed unit (DU) by a user equipment (UE) in a vehicle-to-vehicle (V2V) communication system comprising:
receiving channel spatial information about respective UEs from all UEs contained in a group in which the UE is included;

deciding DU selection on the basis of the received channel spatial information about the respective UEs; and
transmitting the decided DU selection information,
wherein the UE decides DU selection for each of all the UEs contained in the group, and transmits the decided DU selection information of each UE to the corresponding UE.

2. The method according to claim 1, wherein the channel spatial information about the respective UEs is based on a DU selection combination capable of being adjusted by the respective UEs.

3. The method according to claim 2, wherein the channel spatial information about the respective UEs is information about some preferred DU selections selected from among the adjustable DU selection combinations.

4. The method according to claim 1, wherein the user equipment (UE) configured to receive the channel spatial information about the respective UEs from all the UEs is a header UE of the group.

5. The method according to claim 4, wherein the header UE is designated by a base station (BS).

6. The method according to claim 1, wherein the channel spatial information includes at least one of an AoD (Angle of Departure), a PMI (Precoding Matrix Index), an AoD indicator, an angular spread of clusters, a preferred transmit (Tx) beam index, and a transmit (Tx) correlation matrix.

7. The method according to claim 6, wherein:
when the channel spatial information includes the PMI and a final precoder used by the respective UEs is composed of at least two PMIs, the PMI contained in the channel spatial information is identical to some PMIs constructing the final precoder.

8. The method according to claim 7, wherein the some PMIs correspond to a PMI associated with a broad beam.

9. The method according to claim 6, wherein the UE decides DU selection for each UE in a manner that channel spatial correlation between all the UEs contained in the group is gradually reduced on the basis of the transmit (Tx) correlation matrix.

10. The method according to claim 6, wherein:
when the preferred transmit (Tx) beam index is contained in the channel spatial information, the UE decides DU selection for each UE in a manner that the beam index is gradually elongated in association with all the UEs contained in the group.

11. The method according to claim 1, wherein:
when all the UEs contained in the group exchange channel spatial information about the respective UEs with one another using broadcasting/multicasting, the respective UEs contained in the group decide only their own DU selection.

12. The method according to claim 1, wherein the user equipment (UE) receives channel spatial information about the respective UEs contained in the group, only when an event for the group has occurred.

13. The method according to claim 1, wherein the DU selection is decided on the basis of the number and position of DUs activated in the UE.

14. A user equipment (UE) apparatus for selecting a distributed unit (DU) in a vehicle-to-vehicle (V2V) communication system comprising:
a transceiver module configured to transmit and receive information to and from an external device; and
a processor configured to control the transceiver module,
wherein the processor controls the transceiver module to receive channel spatial information about respective UEs from all UEs contained in a group in which the UE is included, decides DU selection on the basis of the received channel spatial information about the respective UEs, and transmits the decided DU selection information using the transceiver module,
wherein the UE decides DU selection for each of all the UEs contained in the group, and transmits the decided DU selection information of each UE to the corresponding UE.

15. The user equipment (UE) apparatus according to claim 14, wherein the channel spatial information about the respective UEs is based on a DU selection combination capable of being adjusted by the respective UEs.

* * * * *